United States Patent [19]

Yang

[11] 4,431,093

[45] Feb. 14, 1984

[54] MOTION SNUBBER

[75] Inventor: Elmer C. Yang, Orange, Calif.

[73] Assignee: Pacific Scientific Company, Anaheim, Calif.

[21] Appl. No.: 357,174

[22] Filed: Mar. 11, 1982

[51] Int. Cl.³ .............................................. F16F 7/04
[52] U.S. Cl. ..................................... 188/378; 74/1.5; 74/89.15; 74/424.8 R; 188/129; 188/134; 188/180; 188/381; 248/562
[58] Field of Search ............... 188/378, 379, 380, 381, 188/129–130, 134, 135, 180, 185, 184; 74/1.5, 89.14, 89.15, 424.8 R, 424.8 B, 424.8 A, 89, 89.1, 89.12; 248/59, 58, 636, 562; 267/114, 134, 140.1

[56] References Cited

U.S. PATENT DOCUMENTS

| 3,203,257 | 8/1965 | Geyer .................................. 74/1.5 |
| 3,329,242 | 7/1967 | Minarick et al. .................... 188/134 |
| 3,659,682 | 5/1972 | Meyer et al. ....................... 188/134 |
| 3,701,401 | 10/1972 | Palma et al. ...................... 188/134 |
| 3,876,040 | 4/1975 | Yang ................................. 188/378 |
| 3,983,965 | 10/1976 | Wright, Jr. ....................... 188/378 |
| 4,103,760 | 8/1978 | Yang ................................. 188/378 |
| 4,105,098 | 8/1978 | Klimaitis .......................... 188/378 |

OTHER PUBLICATIONS dynA/Damp Mechanical Snubbers Brochure, Anchor/Darling Industries, Inc., Kulpsville, Pa.–Jan. 1981.

*Primary Examiner*—Douglas C. Butler
*Attorney, Agent, or Firm*—Knobbe, Martens, Olson & Bear

[57] ABSTRACT

Relative axial motion of a pair of strut members is converted into rotation of an escapement mechanism, which in turn oscillates a balance wheel. If the rotational velocity exceeds a predetermined minimum, the balance wheel inertia initiates a momentary motion snubbing action.

The device used to convert reciprocation of the strut members into rotary motion is releasable so as to permit the operational testing of the motion snubbing mechanism while the strut is mounted in its operational environment.

22 Claims, 18 Drawing Figures

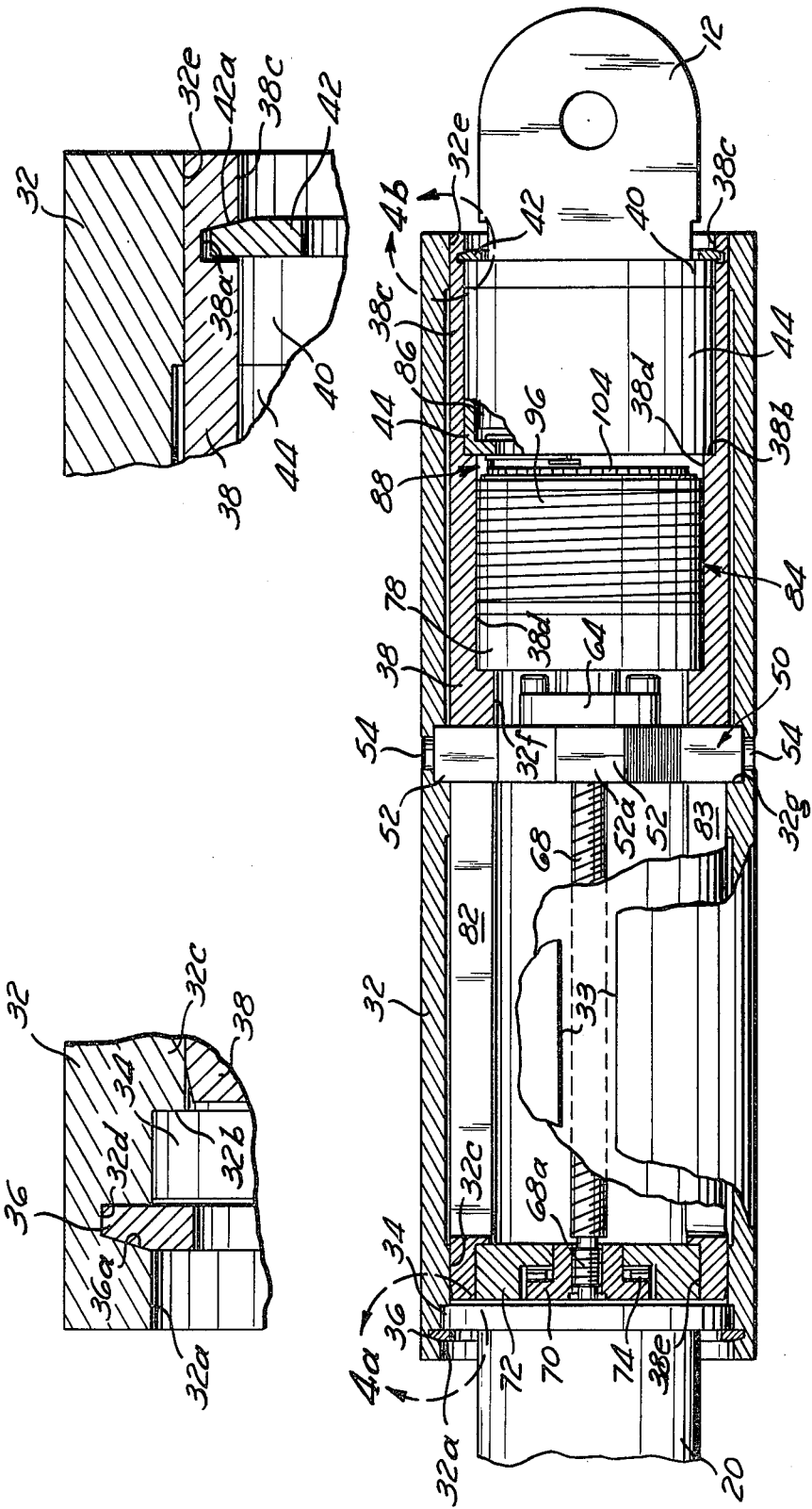

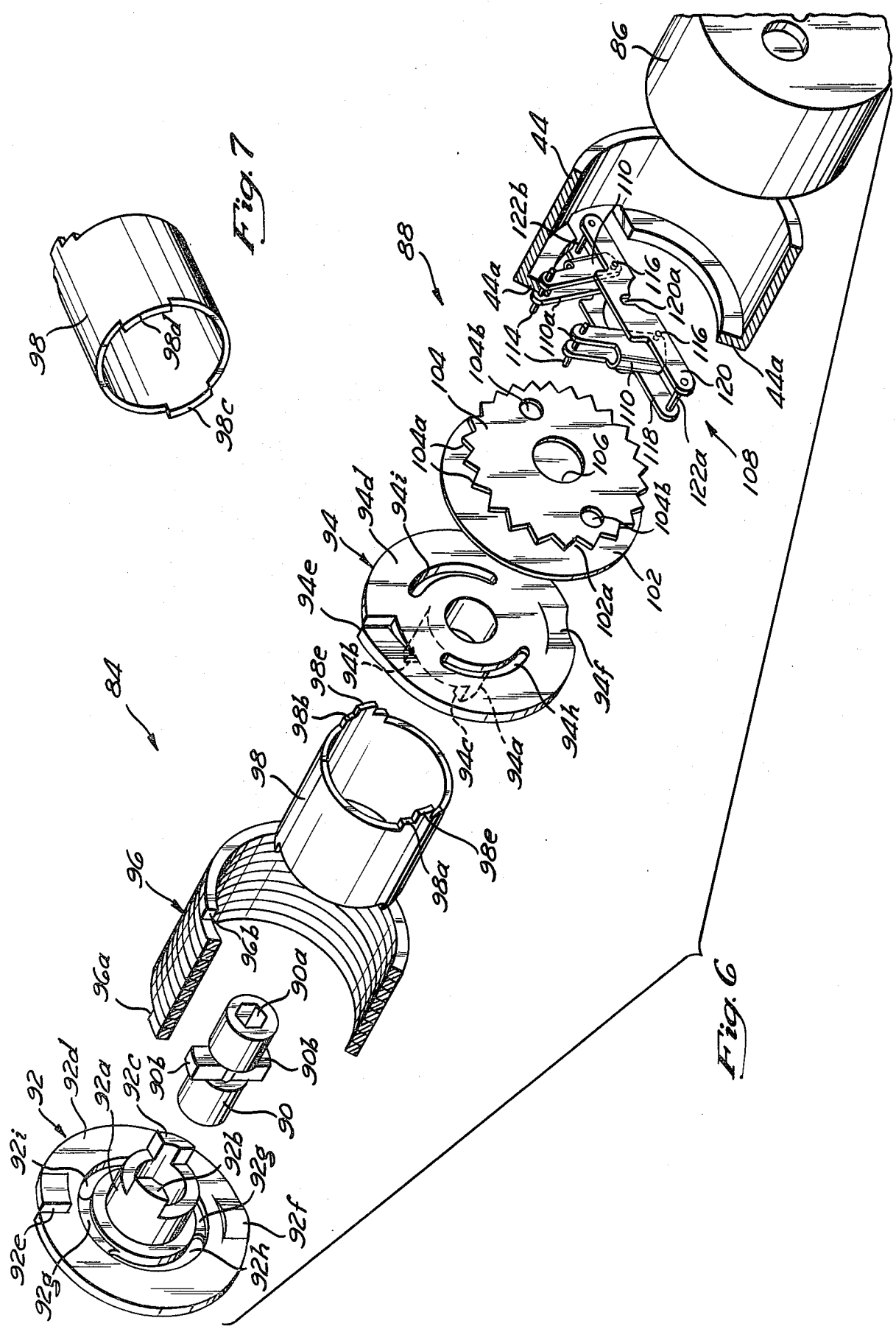

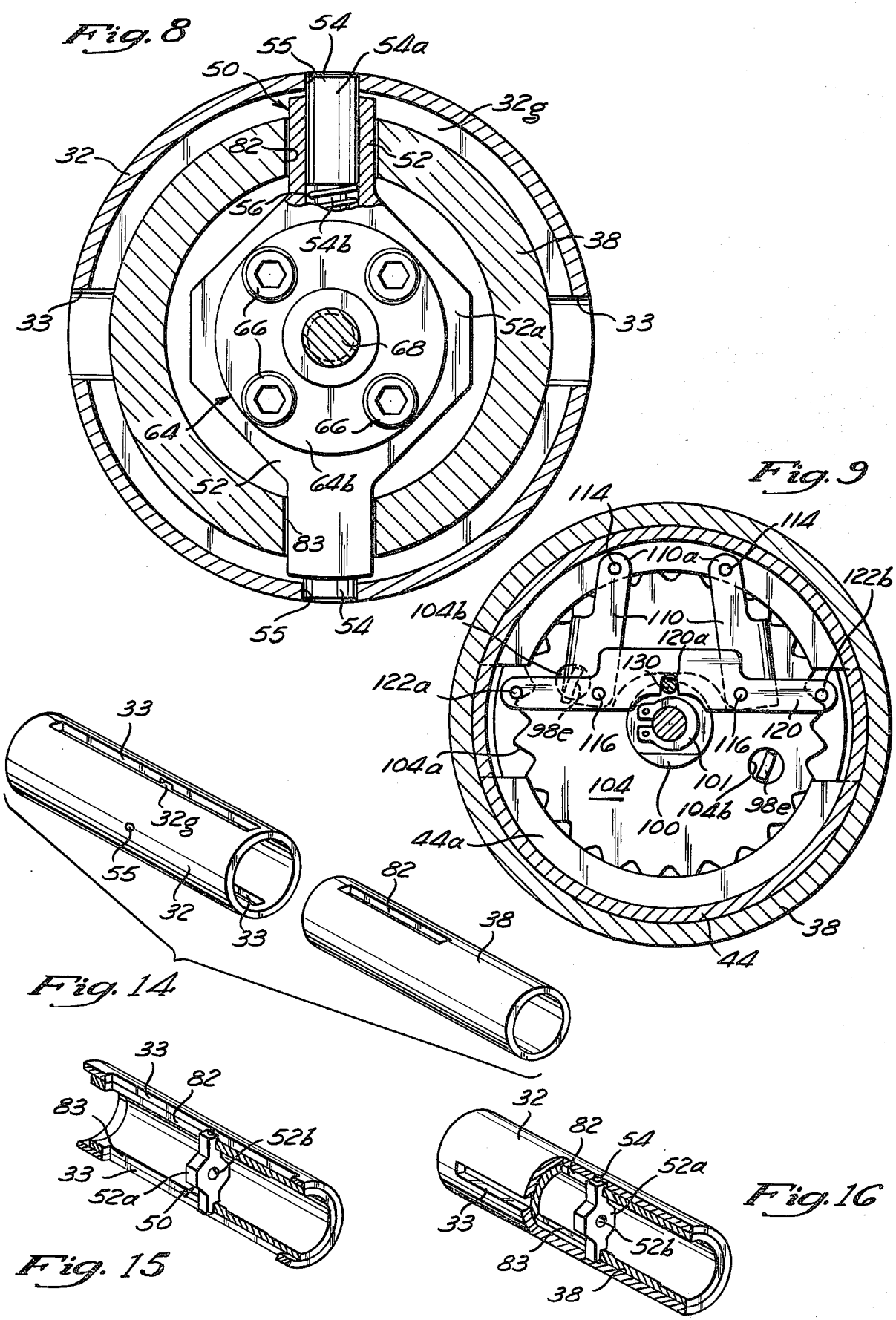

MOTION SNUBBER

This invention relates to mechanical shock arresters and more particularly to an improved motion snubbing strut adapted for use in controlling the movement of objects such as pipes in power generating stations or other such uses.

BACKGROUND OF THE INVENTION

Piping systems and other associated components such as valves, pumps, and steam generators represent a large part of the investment in a power generating station. The effects of a seismic event or other sudden shock load on unprotected or inadquately protected systems can be very costly. Thus it has been necessary to provide shock arresters to control such motion by locating a load-carrying member between the piping or other system and adjacent support structure the instant a load sufficient to cause abnormal motion is initiated. The potentially damaging motion is arrested before it develops. However, for normal, thermal motion the arrester telescopes freely in either direction through its operating stroke.

Previously, hydraulic shock arrestors offered the primary solution to the problem of restraining piping systems and associated components from damage resulting from earthquakes and other shocks while enabling unrestricted movement for thermal motion. Because hydraulic shock arresters are affected by radiation and have other shortcomings, all mechanical shock arresters have been developed.

U.S. Pat. No. 3,876,040, for example, discloses acceleration-sensitive motion snubber that has been widely used. In the system of that patent, reciprocating strut movement is converted to rotary motion and such motion is used to rotate an inertia mass through a coil spring, which also functions as a brake when the inertia of the mass introduces a lagging force. U.S. Pat. No. 4,103,760 produces some improvements to the system shown in the earlier patent, including a pair of inertia masses interconnected by a coil spring. These systems have proven to be highly sensitive and reliable. Nevertheless, requirements have been established for testing the operation of the motion snubbing mechanism periodically after a strut is installed in its working environment in a power generating station. It is a costly and time-consuming procedure to remove a strut and take it to a test station in that some of the struts are quite large and heavy, and many of the struts are mounted in locations that are not easily accessible. Thus, it is desirable that the motion snubbing mechanism be capable of being tested without removing the strut. Some advances have been made in this direction, but a need still exists for an improved strut that will permit simple in-place testing.

The systems described in the above-mentioned patents are acceleration responsive, which means that they will permit a slow increase of velocity. Such increasing velocity could be damaging to a strut if it is improperly handled, and thus other means have been provided to offset this. Thus it is desirable that the motion snubbing mechanism limit velocity to a predetermined maximum but permit the strut to telescope freely in either direction through its operating stroke for normal, thermal motion.

SUMMARY OF THE INVENTION

In accordance with the invention, the reciprocating motion of a pair of strut members is converted into rotary motion of a motion sensitive system that will snub the reciprocation of the strut members in a desired manner. The motion converting means, such as a nut having a high lead thread, is mounted on one strut member, while a shaft or other element to be rotated is mounted on the other strut member. The nut is releasably connected so that the strut member on which it is mounted may be rotated to a position wherein a slot in the strut member permits the nut to be moved axially to test whether the motion snubbing mechanism is free to move and function properly. Once the system has been tested, the nut member may be easily moved back to its rotationally locked position in its supporting strut member in normal operation. Thus, this arrangement permits the strut to be easily tested in place over its full stroke, which is one important feature of the invention.

In the preferred form of motion snubbing mechanism of the invention, a rotating shaft is used to rotate either of two torque transmitting elements that are interconnected by a coil spring or equivalent structure, such that the spring drives the element not being directly driven by the shaft.

The torque transmitting elements are also connected to a torque transmitting tube, which rotates a toothed verge wheel. An escapement mechanism, cooperating with the teeth on the verge wheel, translates rotation of the wheel into oscillating movement of a balance wheel or inertia mass. If relative motion of the strut members exceeds a predetermined speed, the balance wheel imparts a lagging force on the spring, which introduces a braking action and snubs the motion. However, during slow movement, such as during thermal expansion and contraction, the components move without introducing a sufficient lagging force to overcome the spring so that the strut members are not restricted.

Advantageously, the strut members have tubular configurations and the motion snubbing mechanism is compactly positioned within the inner tube. The components are all concentrically mounted except for the lightweight escapement mechanism positioned on one side of the toothed verge wheel. With this compact arrangement, the struts are more easily mountable in locations having restricted space and access.

Another advantage of the arrangement is that the delicate motion sensing mechanism is completely isolated from the axial load on the strut, receiving only the relatively low rotational forces provided by the motion converting means through a coil spring. This enables the motion sensing mechanism to be small and lightweight relative to the mass of the strut members.

BRIEF DESCRIPTION OF THE DRAWINGS

A preferred embodiment of the invention is described below with reference to the accompanying drawings, in which:

FIG. 3 is a longitudinal cross-sectional view of the strut of FIG. 2;

FIG. 4a is an enlarged cross-sectional view illustrating the mounting of one end of the outer strut member;

FIG. 4b is an enlarged cross-sectional view illustrating the connection of the inner tube to its support tongue;

FIG. 6 is an exploded perspective view of the motion snubbing mechanism of FIG. 5;

FIG. 7 is a perspective view of the torque transmitting tube of the mechanism of FIG. 6, showing the end of the tube opposite from that shown in FIG. 6;

FIG. 8 is a cross-sectional view on line 8—8 of FIG. 5, illustrating the releasable connection between the outer strut member and the shaft to be rotated;

FIG. 9 is the cross-sectional view on line 9—9 of FIG. 5, showing the escapement mechanism;

FIG. 14 is an exploded perspective view illustrating the relationship between reciprocating strut members;

FIG. 15 is a cut-away perspective view of the strut members in test position;

FIG. 16 is a perspective view of the strut members, partially sectionalized, in operational position.

DETAILED DESCRIPTION OF THE PREFERRED EMBODIMENT

Figure 1:
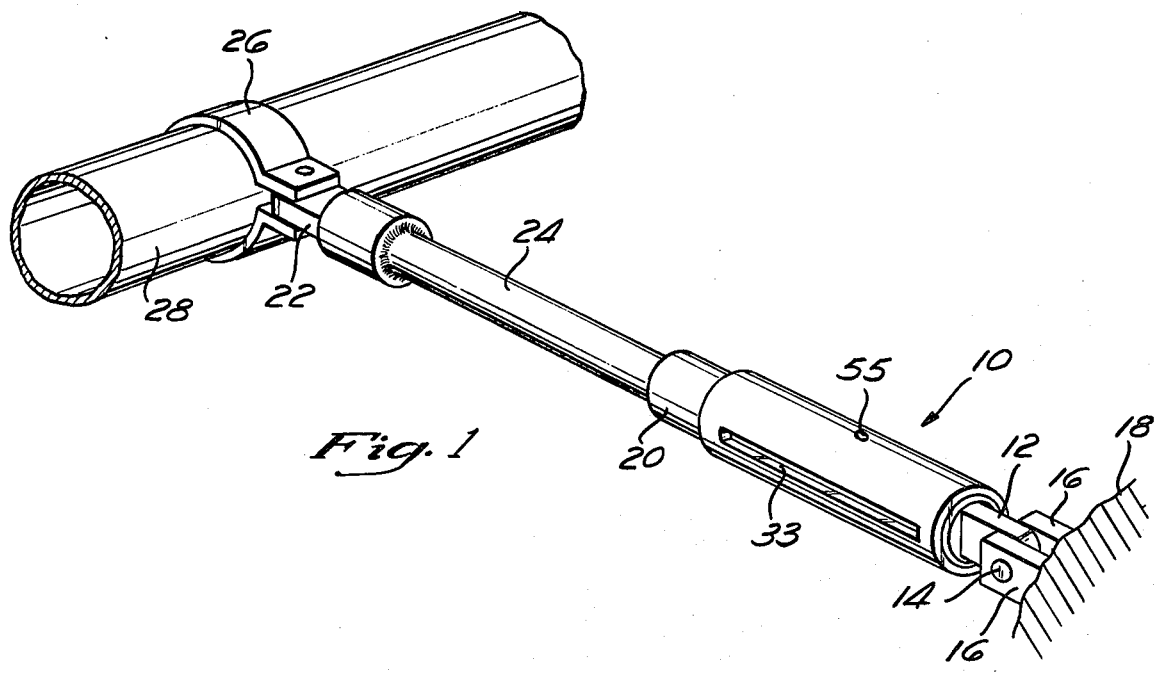
FIG. 1 is a perspective view of a motion snubbing strut of the invention, illustrating its use in a typical application.

As mentioned above, the strut of the invention is particularly useful for snubbing motion of piping or other systems in a power generating station. Such a strut 10 is illustrated in FIG. 1 having a tongue 12 on one end connected by a pin 14 extending through the tongue and a pair of lugs 16 mounted on a support 18, which represents, for example, the wall of a power generating station. A transition tube 20 on the other end of the strut 10 is connected to one end of an extension pipe 24. The other end of the extension pipe is suitably connected with an adapter 22 to a band clamp 26 surrounding a pipe 28 which forms a portion of a piping system. The pipe 28 is further supported by other means (not shown), such as conventional pipe hangers in that the strut 10 is only intended to snub motion. The extension pipe 24 is employed so that the strut can accommodate the various distances between the end of the strut and the pipe clamp 26 which may exist in many mounting arrangement of a piping system.

Figure 2:
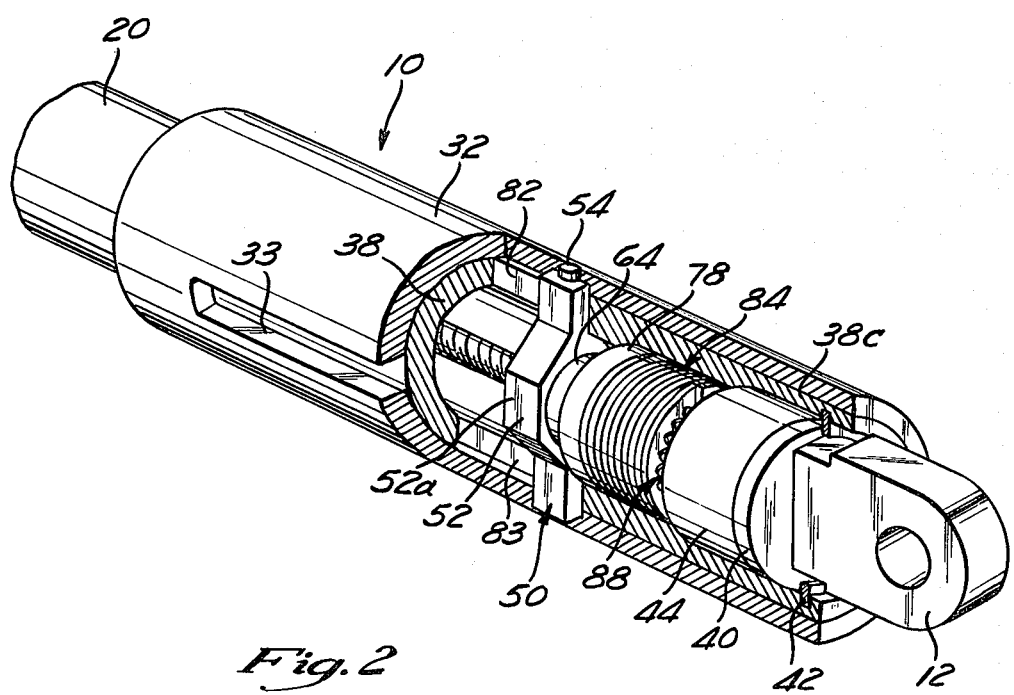
FIG. 2 is a perspective, partially cut-away view of the strut of FIG. 1.

Referring now to FIGS. 2 and 3, it may be seen that the strut 10 includes an outer tubular member 32 which is connected to move axially with the adapter or tongue 22 on the left end of the strut as viewed in FIGS. 2 and 3. (For simplicity of the drawing, the transition tube 20 and pipe 24 are not shown). More particularly, the tongue includes a disk shaped portion 34 which fits within an outer cylindrical portion 32a, as best seen in FIG. 4a, and engages an annular shoulder 32b on the strut member 32 that is formed by the axial face of inwardly extending annular land 32c. A snap ring 36 sits within an annular groove 32d in the strut cylindrical end portion 32a, with a substantial portion of the ring extending radially inwardly from the inner surface of the strut portion 32a. Thus, the disk 34 is axially captured between the shoulder 32b and the axial face of the retaining ring 36. There is a slight clearance between the disk 34 and the retaining ring 36 and the shoulder 32b, such that the outer strut member 32 is rotatable relative to the tongue disk 34, but the tongue and its disk 36 will move with the strut member when an axial force is applied to the strut.

Slidably positioned within the outer strut member 32 is an inner strut member 38 having a tubular configuration. In addition to the inwardly extending annular land 32c, the outer strut member has a similar inwardly extending annular land 32e at the right hand end of the strut 32 and a similar land 32f at the axially central area of the strut 32. These three lands form bearing surfaces for the outer cylindrical surface of the strut member 38 to facilitate movement of the strut members with respect to each other.

A disk 40 formed integral with or fixed to the right hand tongue 12 fits within the cylindrical surface 38c of the inner strut member 38 and is axially captured therein by a snap ring 42 that fits within an annular groove 38a formed within the inner surface of the inner strut member 38 spaced a short distance from its right end as viewed in FIG. 4b. Positioned axially adjacent to the disk 40 is a relatively thick cylindrical shell 44, seen in FIGS. 3 and 5, which engages on its other axial end an annular shoulder 38b formed at the intersection of the end cylindrical surface 38c and an adjacent cylindrical surface 38d of slightly smaller diameter. The axial length of the cylindrical shell 44 and the disk 40 is slightly greater than the axial distance between the shoulder 38b and the annular groove 38a such that the retaining ring 42 is wedged in the annular groove 38a so that the disk 40, the shell member 44 and the inner strut member 38 are essentially axially and rotatably fixed with respect to each other. To accomplish this, note from FIG. 4b that the outer portion of the retaining ring 42 has a bevelled axial face 42a which faces towards the right end of the strut member 38 and engages an axial face of the annular groove 38a which is similarly tapered or bevelled. Thus, although the retaining ring 42 fits within the annular groove 38a, the axial thickness of the shell member 44 and the disk 40 is such that the bevelled surfaces of the retaining ring and the annular groove wedge against each other while the other axial face of the retaining ring is slightly spaced from the adjacent axial surface of the groove 38 and the radially outer edge of the retaining ring 42 is spaced slightly from the radially outer surface of the groove 38a. This arrangement causes the adjoining elements to be fixed with respect to each other, and at the same time accommodate some of the variations in tolerances of the elements.

The strut members 32 and 38 are designed to reciprocate with respect to each other. To control this reciprocation, it is desirable that the motion be translated into rotational force to operate a motion-sensitive snubbing mechanism. For this purpose, there is provided a motion converting mechanism 50 which may be seen in FIGS. 2, 3, 5 and 8. This mechanism includes a crosspiece 52 which extends across the strut members 32 and 38 positioned within an annular recess 32g formed in the inner surface of the outer strut member 32. The cross-piece 52 which has flat axial surfaces that engage the annular axial surfaces of the recess 32g to move axially with the outer strut member 32 when shown in the position of FIGS. 2, 3 and 5. Still referring to FIG. 5, it may be seen that the cross-piece 52 has a radially extending tubular configuration with a depressable retaining pin 54 positioned in each end of the cross-piece. These retaining pins extend upwardly beyond the end of the cross-piece to fit within mating holes 55 formed in the outer strut member 32 to rotationally lock the cross-piece in the outer strut member.

Figure 5:
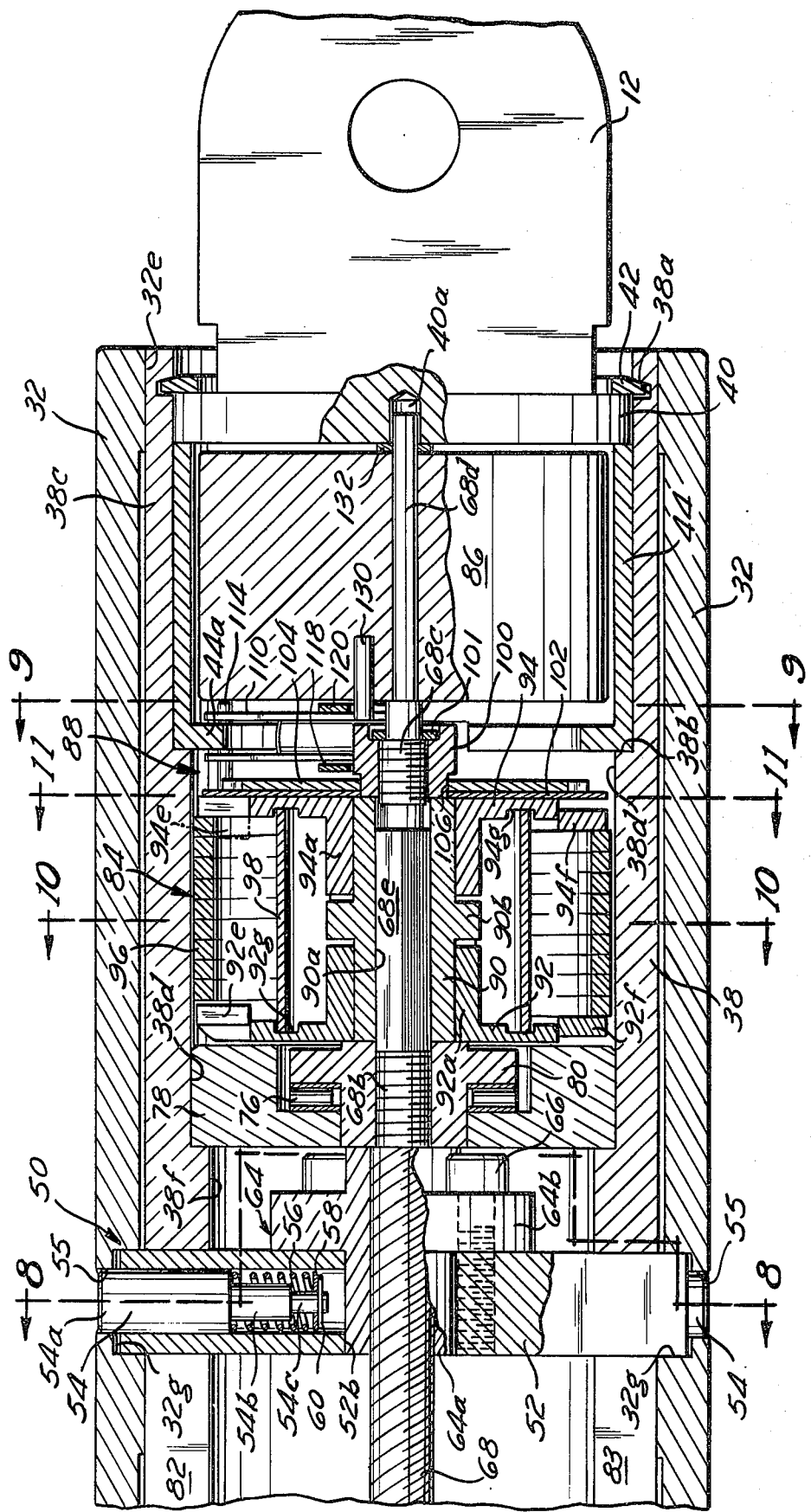
FIG. 5 is an enlarged cross-sectional view of one end of the strut shown in FIG. 3, illustrating the details of the motion snubbing mechanism.

Still referring to FIG. 5, the retaining pin 54 includes a radially outer section 54a having a diameter which slidably fits within the cross-piece 52, a central section 54b of smaller diameter, and an inner section 54c, whose diameter is smaller yet than that of section 54b. Surrounding the central section 54b in most of the smaller section 54c is a compression spring 56 which is captured between the inner shoulder formed by the outer pin section 54a and a retaining washer 58 loosely surrounding the inner pin section 54c and engaging a snap ring 60 which snaps within an annular groove (not shown) formed in the exterior of the pin section 54c spaced slightly from the inner end of the pin. The spring 56 is thus held in compression on the pin 54. The washer 58, sometimes referred to as a star washer, is formed with a plurality of radially extending fingers (not shown) with the outer diameter of the fingers being slightly greater than the inner diameter of the tubular interior of the cross-piece 52. The washer 58 is made of metal but is slightly deformable such that the washer, together with the pin 54 and the components surrounding it, may be inserted from the outer end of the cross-piece into the interior of the cross-piece. The retaining fingers on the washer 58 will cause the washer to remain fixed, gripping the interior of the cross-piece so that the pin cannot be withdrawn in a radially outward direction. The pin is thus pushed inwardly until its outer surface is flush with the outer end of the cross-piece. During this operation, the spring 56 is depressed so that the snap ring 60 will be spaced inwardly slightly from the retaining washer 58, and the spring 56 urges the pin 54 upwardly. Thus when the pin is released with the washer 58 in the position shown in FIG. 5, the pin will snap outwardly into the hole 55 in the outer strut member 32 to the position shown in FIG. 5. The snap ring 60 engaging the star washer 58 limits the outer movement of the pin.

As seen from FIGS. 2, 5, 8, and 16, the cross-piece 52 includes an enlarged hub section 52a having a central hole 52b axially aligned with the axis of the strut members 32 and 38. Positioned within the hole 52b is a tubular portion 64a of a nut 64 which has an outwardly extending thick flange 64b engaging one axial face of the cross-piece hub 52a. A plurality of bolts 66 extend through the flange 64b and thread into the hub 52b so that the cross-piece and the nut form a unitary structure. Note that with the nut 64 removed from the cross-piece 52, the retaining pin 54 may be removed from the cross-piece by pushing it radially inward until the retaining washer 58 is pushed into the central hole 52b of the cross-piece. The retaining washer 58 can then be withdrawn radially outwardly.

The interior of the nut 64 is formed with a high-lead thread which threadably receives a shaft 68 having a mating high-lead thread. Referring to FIG. 3, a bearing nut 70 is threaded onto the left end 68a of the shaft 68 and cooperates with a surrounding bearing housing 72 positioned within the cylindrical portion 38e on the axially outer end of the inner strut member 38. The outer periphery of the inner axial face of the housing 72 engages an inner annular shoulder adjacent the cylindrical portion 38e. An outwardly extending flange portion of the bearing nut 70 fits within a central recess in the outer axial face of the bearing housing 72 to capture in combination with the housing a set of roller bearings 74.

Referring to FIG. 5, the shaft 68 may be seen to be further rotatably mounted by a similar bearing assembly which is adjacent the nut 64. More specifically, the shaft is rotatably mounted on roller bearings 76 captured between a bearing housing 78 and a bearing nut 80 which is threaded onto the threaded portion 68b of the shaft 68. The bearing housing 78 is positioned within the cylindrical portion 38d of the inner housing member 38, with the outer peripheral portion of the axial face of the housing 78 that faces towards the nut 64 engaging an axially facing shoulder formed at the intersection of the cylindrical portion 38d and a cylindrical portion 38f of smaller diameter.

The right end of the shaft 68 is further centered and mounted for rotation within a friction bearing socket 40a formed within the axial face of disk 40 connected to the tongue 12. The bearing 40a receives no significant load but merely serves to center the end of the shaft.

Thus, with the shaft 68 rotatably mounted, reciprocating movement of the strut members 32 and 38 will rotate the shaft 68 by means of the high lead thread on nut 64 and shaft. Note that the inner strut member 38 is provided with a pair of axially extending slots 82 and 83 through which the cross-piece 52 extends, as seen in FIGS. 2, 8 and 16. The strut is shown in FIG. 3 in its fully collapsed position, such that the cross-piece 52 is engaging the end of the slot in the inner strut member 38. When the strut is extended, the cross-piece 52 moves away from this end of the slot in the inner strut member.

Referring to FIG. 3, the rotation of the shaft 68 is utilized to drive a torque transmitting brake mechanism, generally indicated at 84, which in turn drives an inertia mass or balance wheel 86 through an escapement mechanism 88.

Referring to FIGS. 5 and 6, the mechanism 84 may be seen to include a tubular driver 90 having an internal bore 90a with a hexagonal cross-section. The outer surface of the driver 90 is cylindrical except for a central cross-drive lug 90b that extends diametrically across the driver 90 and beyond the adjacent cylindrical surfaces of the driver. The lug, when viewed radially, has a generally rectangular cross-section.

The torque transmitting mechanism further includes a pair of transmitters 92 and 94, which cooperate with a coil spring 96, in addition to a torque transmitting tube 98 surrounding the driver 90 positioned within the spring 96, the torque transmitter 92 includes a tubular central section 92a having a pair of axially extending lugs 92b and c which are diametrically spaced from each other. The inner diameter of the tubular portion 92a is sized to fit closely, but rotatably, around one end of the driver 90 with the ends of the cross-drive lug 90b positioned in the space between the torque transmitter lugs 92b and 92c. The torque transmitter 92 further includes a generally flat disk portion 92d attached to the other end of the tubular portion 92a. One section of the disk portion 92d is axially offset to form a shoulder 92e. Diametrically opposite from the shoulder 92e is a ramp 92f which extends away from the adjacent surface of the disk about half the distance of the shoulder 92e. In the surface of the disk portion 92d, facing the other torque transmitter 94, is formed an annular groove 92g, and a pair of diametrically spaced arcuately extending slots 92h and 92i that extend axially completely through the disk portion 92d.

The torque transmitter 94 is identical to the element 92 but is mounted in the opposite direction such that its tubular portion 94a extends toward the element 92a and fits over the other end of the drive 90 with its lugs 94b and 94c interfitting with the lugs 92b and 92c and the cross-driver lugs 90b. This may be more easily seen in FIG. 10.

Coil spring 96 fits loosely within the cylindrical surface 38d of the inner strut number 38 and extends between the disk portions of the two torque transmitters 92 and 94. One end 96a of the spring engages the shoulder 92e of the torque transmitter 92 while the other end 96b of the spring engages the corresponding shoulder 94e of the transmitter 94.

One end of the cylindrical torque tube 98 fits within the groove 92g of the torque transmitter 92 while the other end of the tube 98 fits within the corresponding annular groove 94g (FIG. 5). The latter end of the tube 98 includes a pair of axially extending lugs 98a and 98b which extend into the slots 94h and 94i in the disk 94d of the transmitter 94. Similarly, the other end of tube 98 has a pair of arcuately and axially extending lugs 98c and 98d, best seen in FIG. 7, which fit within the arcuate slots 92h and 92i in the torque transmitter 92.

As may be seen from FIG. 5, the axial length of the torque tube 98 together with the disk thicknesses at the disk grooves 92g and 94g is approximately equal to the axial length of the driver 90. Thus the outer ends of the disk portions 92d and 94d, as spaced by tube 98 are about flush with the ends of the driver 90. A nut 100 threads onto a threaded portion 68c on the shaft 68 and engages the end of the driver 90, holding it against the bearing nut 80. A lock element 101 prevents the nut from unthreading.

The escapement mechanism 88 positioned adjacent to the outer axial face of the torque transmitter 94 includes a gear washer 102 and an adjacent gear or verge wheel 104 having a plurality of outwardly extending teeth 104a. The gear wheel 104 includes a pair of diametrically spaced holes 104b that are aligned with similar holes 102a in the washer 102. The holes receive drive cogs 98e on the torque tube 98 which extend axially from the drive lugs 98a and 98b. The escapement wheel 104 also includes a central opening 106, as does the washer 102, to permit those elements to be rotatably mounted on the outer cylindrical surface on one end of the nut 100 as may be seen from FIG. 5. Note that the outer surface of the nut portion on which the washer and wheel and mounted is of smaller diameter than an adjacent portion so that these elements are captured between the torque transmitter disk 94d and the shoulder formed on the nut between the two different diameters.

The escapement linkage 108 includes a pair of arms 110 which have somewhat of a U-shaped channel configuration having a pair of spaced fingers 110a on one end that straddle a flange 44a on the cylindrical shell 44 positioned within the inner strut number 38. A pin 114 extends through holes in the fingers as well as a hole through the flange 44a so that the links are pivotally anchored on the flange 44a. The pins 114 are snugly mounted within the fingers 110a but they are further retained or captured between the washer 102 and the adjacent end surface of the balance wheel 86.

Carried on the other ends of the arms 110 are pins 116 which pivotally support a pair of spaced links 118 and 120 that extends transversely across the strut. These links are connected to each other at their ends by a pair of pins 122a and 122b. These pins fit fairly snugly within the holes of the links 118, but extend beyond the links and are captured between the washer 102 and the adjacent face of the balance wheel 86. Referring to FIG. 9 it may be seen that these pins do not interfere with the flange 44a in that the flange is separated into two portions, creating spaces between them. It may also be seen that the distance between the pins 122a and 122b in relation to the location of the links 118 as determined by their support arms 110 is such that the pins 122a and 122b engage the teeth on the periphery of the escapement wheel 104. More specifically, the distance and location is such that one pin 122a will engage the peak of one tooth while the other pin 122b will engage the valley between two teeth on the opposite side. As a result the pins follow the edges of the teeth.

Still referring to FIG. 9, as well as FIG. 6, it may be seen that the link 120 has a centrally located notch 120a, which fits over a pin 130 extending axially from the face of the balance wheel 86. This pin is eccentrically mounted such that when the links 118 and 120 oscillate transversely as seen in FIG. 9, the balance wheel will oscillate rotatably about the spindle portion 68d of the shaft 68. A spacer 132 is positioned between the balance wheel 86 and the disk 40.

OPERATION OF THE SNUBBING MECHANISM

In operation, assume that the strut 10 is mounted in a manner similar to that shown in FIG. 1, and that the strut members 32 and 38 are in a fully collapsed position as shown in FIG. 1 and FIG. 3. Assume further that a tension load is applied to the strut tongues 12 and 20. This causes the strut member 32 to move with the tongue 20 away from the strut member 38 connected to the tongue 112. Movement of the strut member 32 causes the cross-piece to move with it since the cross-piece 52 is captured within the annular recess 32g in the strut member 32, as seen in FIG. 5. As the strut member 32 is stroked away from the strut member 38, the tensile load is transmitted by the nut 64 attached to the cross-piece 52 and applied to the shaft 68 carried by members 38b the shaft, in turn, transmits the axial load through the bearing nut 80, the roller bearings 76, and the bearing housing 78 to the strut member 38. Because the nut 64 and shaft 68 have a high lead thread, a portion of the axial load is converted into rotation of the shaft 68.

Figure 10:
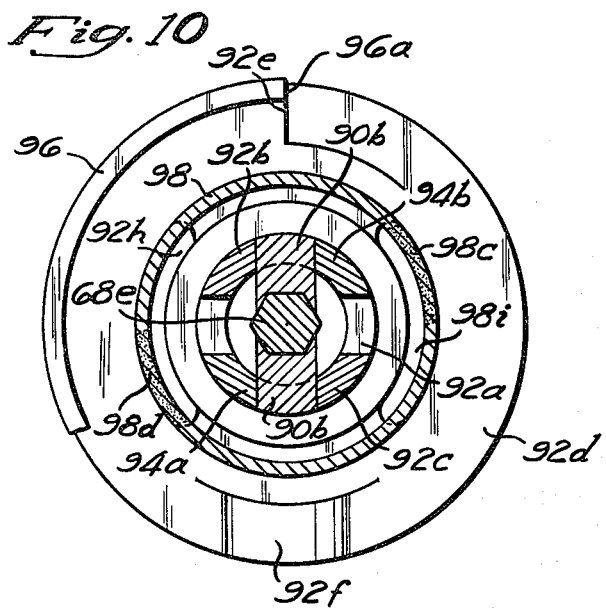
FIG. 10 is a cross-sectional view on line 10—10 of FIG. 5, illustrating the interconnection between the drive shaft and the torque transmitting elements.

Rotation of the shaft 68 rotates the driver 90 by virtue of the hexagonal cross-section of the shaft portion 68e which extends through the driver 90, as may be seen in FIG. 10. If it is assumed that the shaft and driver rotate in the counter-clockwise direction as seen in FIG. 10, the driver lugs 90b engage and drive the lugs 92b and 92c on the torque transmitting element 92. The torque transmitter 92 will, in turn, rotate the spring 96 by virtue of the shoulder 92e on the torque transmitter disk 92d engaging the end 96a of the spring. This, in turn, causes the spring other end 96b to drive the other torque transmitter 94 by engaging the shoulder 94e on the disk 94d, which may be seen in FIG. 11. At slow speed, this causes the lugs 94b to follow directly behind the lugs 90b of the driver, as viewed in FIG. 10. In other words, still referring to FIG. 10, the driver 90 drives the torque transmitting elements 92 in one direction, and that torque transmitter in turn drives the other torque transmitting element by way of the spring 96. With movement of the shaft 68 in the opposite direction, the reverse operation is obtained.

Consider now the movement of the torque tube 98. The tube is driven by the torque transmitting element 92 or 94, which is driven by the spring 96, rather than the torque transmitting element which drives the spring. Thus, again referring to FIG. 10, and still assuming that the torque transmitting element 92 is being driven in a counter-clockwise direction by way of the shaft 68 and driver 90, it may be seen that the arcuate lugs 98b and 98c on the torque transmitting tube that extend into the slots 92h and 92i, respectively, are arcuately shorter than the slots, and the lugs are located at the ends of the slots which are moved away from the lugs when the torque transmitter is moved in a counter-clockwise direction. However, in referring to FIG. 11, it may be seen that the lugs 98a and 98b on the other end of the torque transmitting tube are located at the opposite ends of the slots 94h and 94i, and that when the torque transmitting element 94 is driven in the counter-clockwise direction by the spring 96, the torque transmitting tube 98 is also driven in a counter-clockwise direction by virtue of the edges of the slots 94h and 94i engaging the lugs 98a and 98b, respectively. Note that in the reverse situation, wherein the torque transmitting element 94 is the driving element and the element 92 is the driven element, the torque transmitting tube would be rotated by the driven element 92. It should be noted by comparing FIGS. 10 and 11 that the torque transmitting elements 92 and 94 are angularly oriented by the driver lugs 90d and the coil spring 96. The arrangement is such that with the components at rest the arcuate slots 92h and 92i of the element 92 are axially aligned with the slots 94h and 94i of the element 94. The lugs 98d and 98c on the torque tube 98 are, however, angularly offset with respect to the lugs 98a and 98b on the other end of the torque tube. The amount of the offset is selected so that the lugs on one end of the torque tube engage one end of the slots on one element while the lugs on the other end of the torque tube engage the other ends of the slots on the other element. In the arrangement shown, this offset is about 45 degrees.

Figure 11:
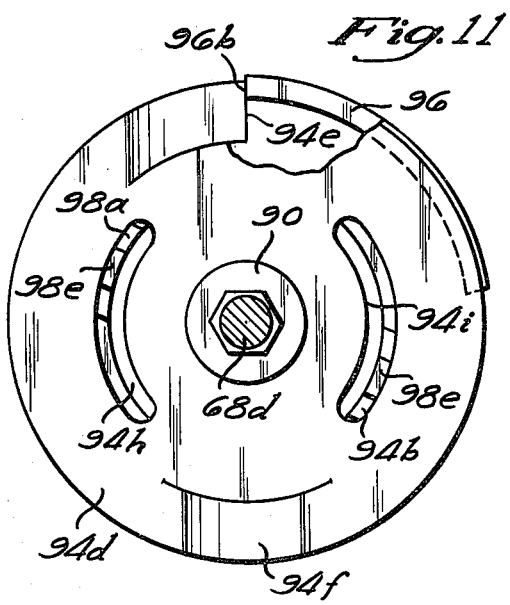
FIG. 11 is a cross-sectional view on line 11—11 of FIG. 5, showing the end of one of the torque transmitting elements and its relationship with the coil spring.

As may be seen from FIGS. 6, 9 and 11, rotation of the torque tube 98 will cause its cogs 98e extending through the holes 104b of the escapement gear wheel 104 to rotate the gear wheel accordingly. Referring to FIG. 9, rotation of the gear wheel 104 causes its teeth to move past the pins 122a and 122b. As explained above, this causes the links 118 and 120 of the escapement mechanism to oscillate transversely, or move from side to side, as viewed in FIG. 9. This movement is permitted by virtue of the pivotal connection between the links 118 and 120 and arms 110.

The movement of the link 120 moves the eccentric pin 130 back and forth in a short arc causing the balance wheel 86 to oscillate in that arc. There is considerable inertia in the balance wheel, which imparts a drag through the movement of the escapement mechanism, which in turn is transfered back through the gear wheel 104 through the torque tube 98 to one of the torque transferring elements 92 and 94 and hence to the spring 96. During slow movement of the strut members, such as that occurring during normal thermal expansion and contraction of the components, the inertia is such that no braking action is initiated. However, with rapid movement such as that occurring during a seismic event, or a sudden movement of a temporarily stuck pipe, the lagging force imparted by the balance wheel will produce an unwinding force on the spring 96, causing its outer diameter to expand and engage the surrounding surface 38d of the strut member 38. This produces braking action on the movement of the strut to snub quickly the velocity of the movement. When the lagging force is dissipated, the spring will return to its unstressed condition so that the braking is only momentary and ceases once the velocity has dropped below a predetermined level.

This operation may be more thoroughly understood by referring to the cross-sectional views of FIGS. 10-13. As explained above, during slow movement the coil spring does not unwind and the components maintain the relative position shown in FIGS. 10 and 11. If however there is sudden movement, say in the counter-clockwise direction of the shaft 68, the driver 90 engages the lugs 92b and 92c of the torque transmitting element 92 and moves it in a counter-clockwise direction as illustrated on FIG. 12. This, in turn, moves the spring end 96a in a counter-clockwise direction as illustrated. The spring, through its other end 96d, attempts to also drive the torque transmitting element 94 in a counter-clockwise direction as described above in connection with FIGS. 10 and 11, however, the torque transmitting tube 98 cannot move initially because of the inertia of the balance wheel as transmitted to the torque tube by way of the escapement mechanism linkage and gear wheel. Since the torque tube cannot move from the position shown of FIGS. 10 and 11, the torque transmitting element 94 is prevented from rotating as a result of the lugs 98a and 98b engaging the end of the slots 94h and 94i as shown on FIG. 11. Consequently, one end of the spring 96b which is illustrated in phantom line FIG. 12 (since it does not actually appear in FIG. 12) remains stationary while the other end 96a moves as indicated. This produces the unwinding action in the spring referred to above, which produces a temporary braking action.

Figure 12:
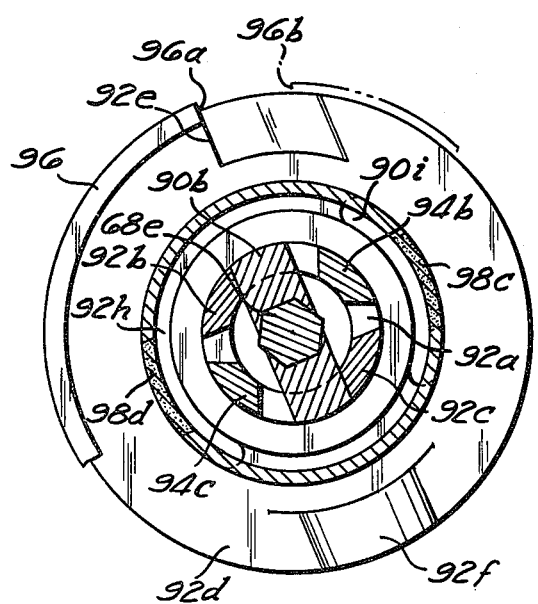
FIG. 12 is a cross-sectional view corresponding to FIG. 10, but with one torque transmitting element rotated a small amount in one direction.

It should be noted by comparing FIG. 10 and 12 that an arcuate gap exists between the lug 92b of one torque transmitting element and the lug 94b of the other element when the elements are at rest or moving in unison. Similarly a gap exists between the lugs 92c and 94b. These gaps permit the lugs 92b and 92c of the one element to move in a counter-clockwise direction as illustrated in FIG. 12 without interfering with the stationary lugs 94c and 94b of the other element. Or stated differently, it can be seen from FIG. 12, that the driving lugs 90b of the driver 90 are driving and engaged with the lugs 92b and 92c of the element 92 while those driving lugs 90a and 90b have moved away from the lugs 94a and 94b of the other torque transmitting element.

Figure 13:
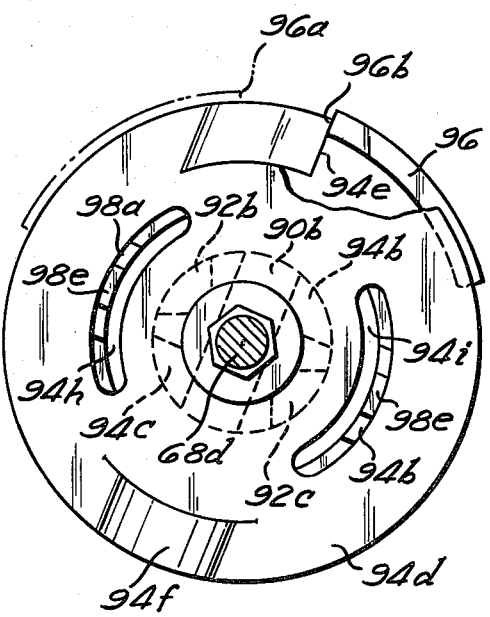
FIG. 13 is a cross-sectional view corresponding to FIG. 11, but with one of the torque transmitting elements rotated a small amount in the direction opposite to that rotation shown in FIG. 12.

FIG. 13 illustrates the situation opposite from that in FIG. 12 wherein the shaft 68 imparts a sudden clockwise movement from driver 90, which drives the torque transmitting element 94 in a clockwise direction, but the element 92 is prevented from moving temporarily because the torque tube 98 is temporarily held stationary by virtue of the inertia of the balance wheel. That is, with the torque tube lugs 98c and 98d positioned as shown in FIG. 10, the torque transmitting element 92 is prevented from moving in the clockwise direction. Thus the spring end 96a remains stationary as illustrated in FIG. 13, which results in the unwinding of the springs and corresponding braking action.

Thus it can be seen that the arrangement described snubs the rapid movement of the strut members in either of two opposite direction but yet permits slow gradual movement and does not lock-up with the introduction of a force producing significant movement in one direction. The balance wheel escapement mechanism is quite sensitive and reliable, and the spring provides a large mechanical advantage whereby the small dragging load or force imparted by the balance wheel provides substantial braking action of the strut members. It should also be noted that the escapement mechanism is isolated from the primary loads on the struts which permits use of relatively delicate, but yet reliable, components such as that of the escapement mechanism.

Figure 17:
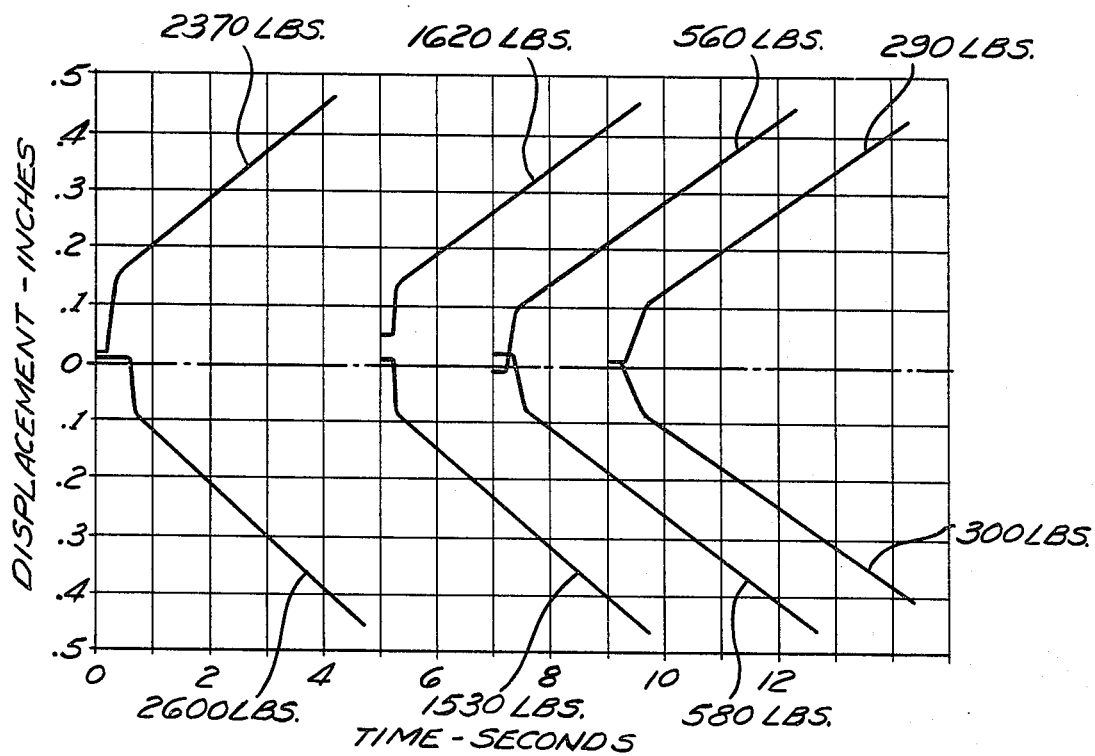
FIG. 17 is a graph illustrating the velocity curve of the strut members with various loads.

The braking mechanism is basically velocity sensitive which means that braking is applied at a particular velocity. This might suggest that the braking force would be gradually increased with velocity, but the combination of the coil spring and the escapement mechanism quickly produces sufficient braking to prevent velocity beyond a rather precise point regardless of the load. This is advantageous in meeting governmental safety requirements in nuclear power plants. FIG. 17 illustrates this by showing that the maximum velocity attained by the strut components is approximately the same with different loads. With the horizontal representing time and vertical representing displacement, the shape of the test lines represents the relative velocity of the strut members. The test results show the strut under tension in one direction and compression in the other. As can be seen with a wide range of different loads applied, motion is quickly snubbed so that velocity does not exceed approximately 0.10 inch per second but all approach that velocity. Of course the desired velocity limit can be easily attained by varying the inertia of the balance wheel or by varying the design of the spring or the escapement.

From a reliability standpoint, note that the axial load applied to the shaft 68 is always a tension load on the shaft rather than compressive. This is advantageous from a standpoint of preventing lateral flexing of the relatively small diameter shaft. Thus, when a tension load is applied to the strut, a tension load is applied to the shaft 68 between the nut 64 and the bearing housing 78 carried by the strut member 38. When a compression load is applied to the strut members, a tension load is applied to the shaft 68 between the nut 64 and the bearing housing 72, carried by the strut member 38.

TESTING OF THE SNUBBER MECHANISM IN PLACE

As explained above, another feature of the snubber is that it can be tested while still connected to its operational components, as shown in FIG. 1. To test the mechanism, it is only necessary that the nut 64 be moveable axially along the shaft 68 to cause the shaft to rotate, and see whether braking will occur at the desired velocity. Normally, this is prevented in that the nut is attached to cross piece 52 which in turn is axially fixed in the annular recess 32g in the inner surface of the outer strut member 32. However, the cross piece may be released from this groove by a two-step process. First, the retaining pins 54, shown in FIGS. 5 and 8 are depressed sufficiently to release them from the holes 55 in the outer strut member 32. The outer strut member can then be rotated 90° to a position where a pair of axially extending slots 33 in the outer strut member are aligned with the axially extending slots 82 and 83 of the inner member 38. As seen from the exploded view of FIG. 14, with the slots aligned, the slots in the outer member 32 extend substantially throughout the length of the strut member which permits stroking of the cross piece throughout the inner slots 82 and 83 regardless of the collasped or extended position of the strut member. Thus, for example, with the components in a completely telescoped position of FIG. 15, the cross piece 52 can be moved in the left half of the outer slots 33. If the strut members were fully extended, the cross piece would move in the right half of the outer slots 33.

During testing of the device, loads of a given size or at a given speed may be applied to be sure that the device is free to move at slow speeds but will brake at higher speeds. Since the escapement mechanism is essentially a clock or timing device and produces a ticking noise as it oscillates, testing may be conducted by using a listening device in that the oscillation frequency is related to the braking applied and the velocity permitted. When the testing is complete and it is desirable to return the strut members to the operational position shown in FIG. 16, it is only necessary to return the cross piece to the point where it is circumferentially aligned with the annular recess 32g, depress the pins 54, and rotate the other strut member 32 until the pins 54 pop into the holes 55 in the outer strut member.

What is claimed:

1. A motion snubbing device including first and second strut members mounted for relative reciprocation;
a balance wheel rotatably mounted on one of said strut members;
means for converting the reciprocation of said strut members into oscillating movement of said balance wheel utilizing the movement of the strut members to drive the balance wheel in both directions of its oscillation; and
brake means connected to the balance wheel in a manner such that the inertia of said balance wheel initiates braking action by the brake means for limiting the reciprocation of said strut members.

2. The device of claim 1, wherein said conversion means includes a torsion spring for transmitting rotation to said balance wheel, and said brake means includes a brake surface adjacent to said torsion spring arranged such that a lagging force introduced by said balance wheel will change the diameter of said spring, causing it to engage the brake surface to provide a braking action on said strut members.

3. The device of claim 1 wherein said conversion means includes an escapement mechanism having a gear wheel, and an escapement linkage which cooperates with the gear wheel to produce an oscillating movement which is transmitted to said balance wheel.

4. The device of claim 3, wherein said escapement mechanism, includes a pair of links which extend across said gear wheel, a pair of pins mounted on said links and cooperating with the gear wheel teeth, with the distance between said pins being arranged with respect to the gear wheel teeth in a manner that causes the links to move in an oscillating manner, a crank pin eccentrically mounted in an end of said balance wheel driven by one of said links in an oscillating manner.

5. The device of claim 4, wherein said one link has a notch for receiving said crank pin.

6. The device of claim 4, wherein said escapement mechanism includes a pair of arms pivotally mounted to opposite ends of said links and pivotally mounted to an adjacent support so that the links are free to move but are supported by said arms.

7. The device of claim 1 wherein said converting means includes a shaft rotatably mounted on said one strut member, means for converting reciprocation of said strut members into rotation of said shaft, a pair of torque transmitting elements, a driver rotated by said shaft connected to drive one of said elements when rotated in one direction and to drive the other of said elements when rotated in the opposite direction, a coil spring connected between said elements, to be driven by the element driven by said driver and to drive the other torque transmitting element, a torque tube connected to be driven by the driven torque transmitting element, and an escapement mechanism driven by said torque tube and connected to oscillate said balance wheel, and wherein said brake means includes a brake surface surrounding said coil spring to be engaged by said spring whenever the inertia of said balance wheel provides a lagging force on said spring by way of said escapement mechanism said torque tube and said driven torque transmitting element, said lagging force causing the spring to expand so that the spring engages the brake surface to snub the movement to said strut members.

8. The device of claim 7 wherein said driver surrounds a portion of said shaft, said torque transmitting elements cooperate with said driver and include disc-like portions which concentrically support said coil spring spaced outwardly from said driver, and said torque tube is concentrically positioned and spaced between said driver and said coil spring and connected to and driven by said torque transmitting elements, said torque tube includes means extending through one of said disc-like portions on one torque transmitting element to drive said escapement mechanism.

9. The device of claim 1 wherein said converting means includes means releasably mounted on one of said strut members to permit it to be axially moved for test purposes while the strut members are stationary.

10. The device of claim 1 wherein said strut members have tubular configurations and an inner strut member slides within an outer strut member, said inner member having a pair of axially extending slots, said converting means includes a shaft rotatably mounted within the inner strut member and means releasably mounted on the outer strut member and extending through said slots to cooperate with said shaft to convert reciprocation of said strut members into rotation of said shaft, said outer strut member including axially extending slots which may be radially aligned with slots of said inner strut member when said releasably mounted means is released, whereby said converting means may be moved axially in said aligned slots relative to said strut members to permit testing of the device while the strut is connected in an operating environment.

11. In a motion snubbing device comprising inner and outer tubular strut members mounted on each other for axial reciprocation relative to each other, means rotatably mounted on said inner strut member for snubbing movement of said strut members, and means for converting relative reciprocation of said strut members into rotation of said snubbing means, the improvement wherein the means for converting the reciprocation of said strut members into rotation of said snubbing means is releaseably mounted on said outer strut member, and said inner strut member is provided with an axially extending slot means through which said conversion means extends from the outer strut member to said snubbing means, said slot means permitting the conversion means to move axially relative to said inner strut member, said outer strut member also including axially extending slot means which is arcuately offset with respect to the slot means in said inner strut member during normal operation of the device, said outer strut member being rotatable to permit the slot means in the outer strut member to be aligned with the slot means in the inner strut member when said conversion means is released from said outer strut member, said conversion means then being axially moveable relative to said strut members to permit the motion snubbing means to be tested while the ends of said strut members are mounted in a operational position.

12. A motion snubbing device comprising:
first and second strut members mounted for relative movement;
a balance wheel rotatably on one of said strut members;
means connecting said balance wheel to the second strut member in a manner such that relative movement of said strut members oscillates said balance wheel with the strut member movement driving the balance wheel in both directions of its oscillation; and
brake means connected to said balance wheel in a manner such that attempting to oscillate said balance wheel above a predetermined velocity threshold initiates braking action on said strut members while limiting motion approximately to said threshold, essentially independent of the load applied to said strut members.

13. The device of claim 12 wherein said connecting means includes a crosspiece which extends across said inner strut member and which has pins on its ends which fit within mounting holes formed in said outer strut member, spring means urging said pins outwardly, in said crosspiece but being depressable inwardly to permit the pins to release the crosspiece from the holes, and permit said outer strut member to be moved to a position to align its slots with the slots of the inner members.

14. A method of testing in its operational position, a motion snubbing strut having a pair of inner and outer tubular strut members mounted for relative reciprocation on each other, a shaft rotatably mounted on and positioned within the inner member, motion converting means releasably carried by said outer member and extending through said slots in said inner member engaging said shaft to convert relative reciprocation of said strut members into rotation of said shaft, and motion snubbing means driven by said shaft and mounted within said inner strut member, said method comprising:
releasing the connection between said outer strut member and said converting means so that said converting means may be moved axially relative to said strut members to impart rotation to said shaft while said strut members are stationary.

15. A motion snubbing device comprising first and second members mounted for relative movement and adapted to be connected to objects whose relative motion is to be snubbed; a rotatably mounted balance wheel for initiating motion snubbing of the members; means for translating relative movement of said members into oscillation of said balance wheel wherein the balance wheel is driven in both directions of its oscillation by said relative motion, said means including an escapement mechanism and a torsion spring which isolates the escapement mechanism and balance wheel from the load applied to said members.

16. A method of snubbing relative motion between two members comprising converting the motion into the oscillation of a balance wheel wherein the balance wheel is driven in both directions of its oscillation by said relative motion; and utilizing the inertia of said wheel to initiate operation of a brake at a predetermined velocity and to limit the motion to approximately such velocity.

17. The method of claim 16 including oscillating the balance wheel through an escapement mechanism driven by a coil spring which changes its coil diameter to initiate the braking action when subjected to a predetermined lagging force caused by the inertia of said balance wheel.

18. A motion snubbing device comprising:
an outer tubular strut member;
an inner tubular strut member mounted to reciprocate on said outer member;
a pair of axially spaced bearings supported on said inner strut members;
a shaft rotatably mounted on said bearings;
motion converting means mounted on said outer strut member extending through said inner member cooperating with the portion of said shaft between said bearings to convert relative axial movement of said strut members into rotation of said shaft;
said bearings being arranged such that relative axial movement of said strut members in one direction creates a tension load on said shaft bearings, and relative movement in the other direction creates a tension load on said shaft between the conversion means and the other bearing; and
means driven by said shaft for limiting movement of said strut members.

19. The apparatus of claim 18 wherein said inner strut member has a pair of axially spaced annular shoulders each of which is facing axially outwardly toward its adjacent end of said inner strut and one of said bearings is positioned against one shoulder and the other bearing is positioned adjacent the other shoulder.

20. A motion snubbing device comprising:
first and second members mounted for relative movement and adapted to be connected to objects whose motion is to be snubbed;
mechanical timing means;
drive means operated by relative movement of said members in each of two opposite directions to drive said timing means; and
brake means actuated by said timing means to initiate braking action on said members at a predetermined velocity and to limit velocity approximately to said predetermined level.

21. The motion snubbing device of claim 20 wherein said drive means includes a resilient connection that isolates the timing means from a load applied to said members and permits driving of said timing means to lag the relative movement of said strut members to initiate the braking action.

22. The motion snubbing device of claim 21 wherein said mechanical timing means includes a balance wheel and an escapement mechanism connected to said drive means to provide oscillating movement of said balance wheel that produces a lagging force which actuates said brake means when said predetermined velocity is reached.

* * * * *